United States Patent
Mallon

(10) Patent No.: US 11,126,413 B2
(45) Date of Patent: Sep. 21, 2021

(54) COMPILING DEVICE AND METHOD

(71) Applicant: KONINKLIJKE PHILIPS N.V., Eindhoven (NL)

(72) Inventor: Willem Charles Mallon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 244 days.

(21) Appl. No.: 16/475,731

(22) PCT Filed: Jan. 5, 2018

(86) PCT No.: PCT/EP2018/050257
§ 371 (c)(1),
(2) Date: Jul. 3, 2019

(87) PCT Pub. No.: WO2018/127557
PCT Pub. Date: Jul. 12, 2018

(65) Prior Publication Data
US 2021/0132920 A1    May 6, 2021

(30) Foreign Application Priority Data

Jan. 5, 2017   (EP) .................................... 17150336

(51) Int. Cl.
*G06F 8/41*    (2018.01)
(52) U.S. Cl.
CPC ................ *G06F 8/427* (2013.01); *G06F 8/44* (2013.01)

(58) Field of Classification Search
None
See application file for complete search history.

(56) References Cited

U.S. PATENT DOCUMENTS

| 5,978,588 | A  | 11/1999 | Wallace      |
|-----------|----|---------|--------------|
| 6,594,761 | B1 | 7/2003  | Chow et al.  |
| 6,842,862 | B2 | 1/2005  | Chow et al.  |
| 7,254,586 | B2 | 8/2007  | Chen et al.  |

(Continued)

OTHER PUBLICATIONS

Agosta et al:"The Meet Approach: Securing Cryptographic Embedded Software Against Side Channel Attacks"; IEEE Transactions on Computer Aided Design of Integrated Circuits and Systems, vol. 34, No. 8, Aug. 2015, pp. 1320-1333.

(Continued)

*Primary Examiner* — Ryan D. Coyer

(57) ABSTRACT

A compiling device (100) configured to convert a source code computer program (102) into an object code computer program (106), the compiling device comprising—a processor circuit arranged to—parse (120) the source code computer program and generate a static single assignment (SSA) graph (122) for at least a portion of the source code computer program, and—search for a second subgraph (P) of the SSA graph, wherein a first subgraph (N) is a subgraph of the second subgraph (N⊆P), a sum of the bit sizes associated to incoming edges of the second subgraph being smaller than a sum of the bit sizes associated to incoming edges of the first graph, —implementing the second subgraph of the SSA graph in the object code computer program as a single operation thus omitting the assignments corresponding to edges of the first subgraph.

15 Claims, 11 Drawing Sheets

(56) References Cited

U.S. PATENT DOCUMENTS

| | | | | |
|---|---|---|---|---|
| 8,572,590 B2* | 10/2013 | Lethin | ............... | G06F 8/452 |
| | | | | 717/143 |
| 8,719,805 B2* | 5/2014 | Zhao | ............... | G06F 8/427 |
| | | | | 717/143 |
| 8,745,599 B2* | 6/2014 | Lee | ............... | G06F 8/434 |
| | | | | 717/133 |
| 9,117,094 B2 | 8/2015 | Anckaert et al. | | |
| 9,201,659 B2* | 12/2015 | Dhurjati | ............... | G06F 9/3877 |
| 2006/0218539 A1 | 9/2006 | Stiemens et al. | | |
| 2007/0094646 A1* | 4/2007 | Higham | ............... | G06F 8/44 |
| | | | | 717/136 |
| 2013/0305094 A1 | 11/2013 | Hopley | | |

OTHER PUBLICATIONS

Bayrak et al: "Automatic Application of Power Analysis Countermeasures"; IEEE Transactions on Computers, vol. 64, BI, 2M Febryart 2015, pp. 329-341.

Hao et al: "A Faster Algorithm for Finding the Minimum Cut in a Directed Graph"; Journal of Algorithms 17, pp. 424-446, 1994.

Hoheisel: "Side-Channel Analysis Resistand Implementation of AES on Automotive Processors"; Master Thesis, Ruhr University Bochum, Jun. 12, 2009, 111 Page Document.

PCT/EP2018/050257, ISR and Written Opinion, dated Mar. 27, 2018, 18 Pages.

* cited by examiner

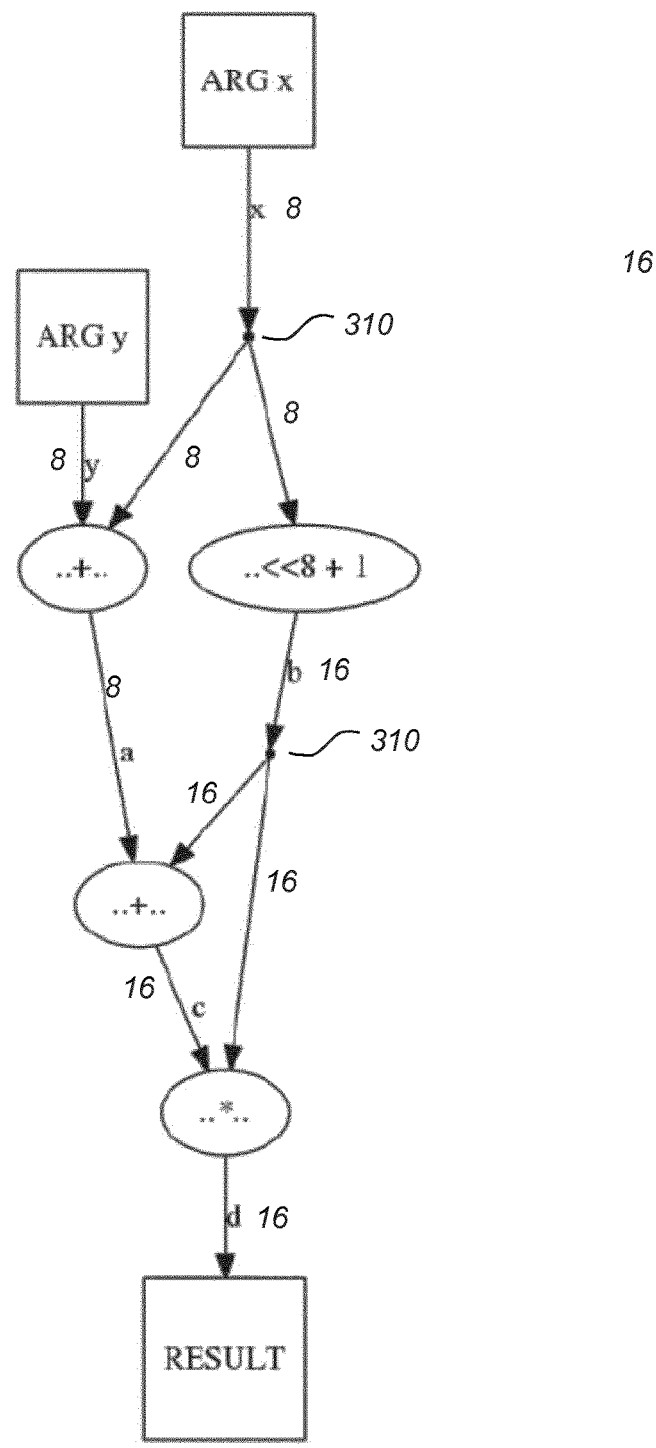
```
input byte y;
input byte x;
byte  a = x + y;
short b = x << 8 + 1;
short c = a + b;
short d = c * b;
```
Fig. 2a                    Fig. 2b

| Example 1:<br>HIDDEN int x; | Example 2:<br>int x;<br>(…)<br>x=1+b;<br>(..)<br>HIDDEN x;<br>y=1+c<br>x=a+b<br>(…)<br>UNHIDDEN x; | Example 3<br>int x;<br>(…)<br>x=1+b;<br>(..)<br>HIDDEN;<br>y=1+c<br>x=a+b<br>(…)<br>UNHIDDEN; |
*Fig. 2c*
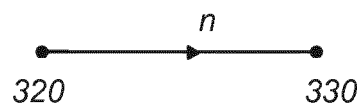
*Fig. 2d*
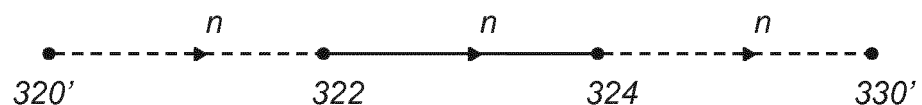
*Fig. 2e*

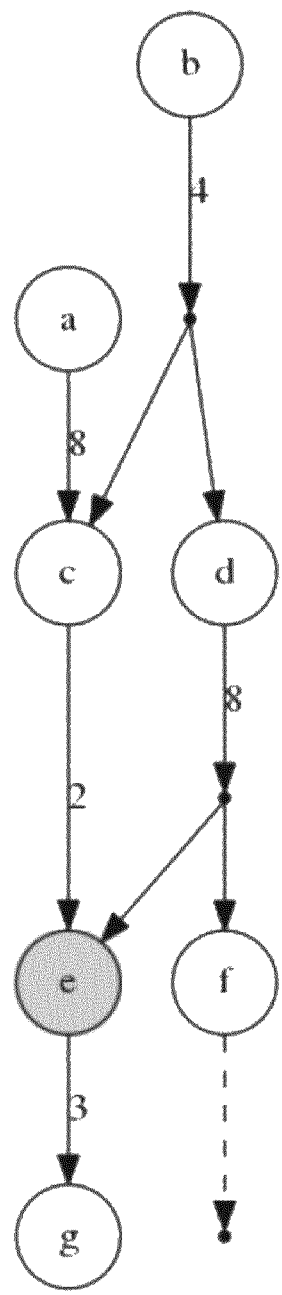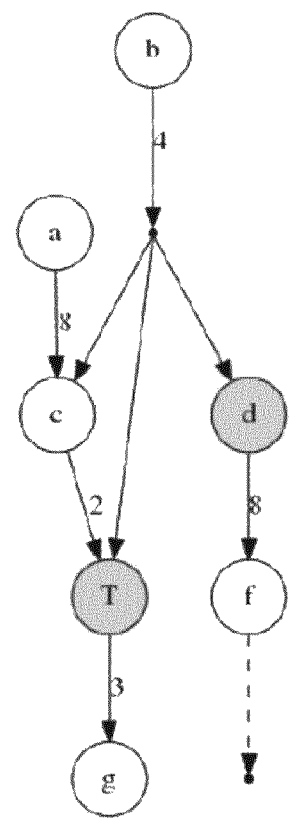
Fig. 3a                    Fig. 3b

```
input byte a;

byte y = a << 8 | 4;
HIDDEN byte x = f(y)
byte v = encA(x)
byte w = encB(x)

short z = v << 8 | w
```

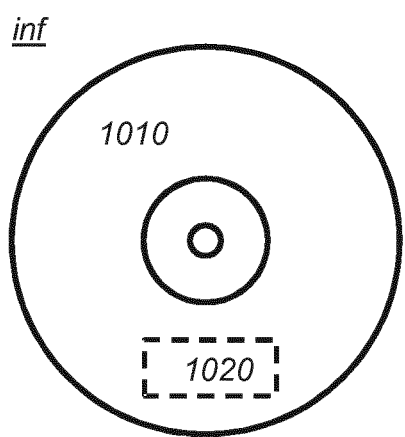 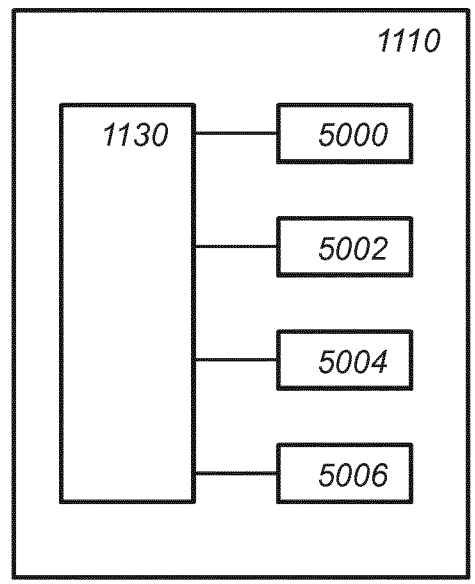
*Fig. 7a*              *Fig. 7b*

COMPILING DEVICE AND METHOD

CROSS-REFERENCE TO PRIOR APPLICATIONS

This application is the U.S. National Phase application under 35 U.S.C. § 371 of International Application No. PCT/EP2018/050257, filed on Jan. 5, 2018, which claims the benefit of European Patent Application No. 17150336.0, filed on Jan. 5, 2017. These applications are hereby incorporated by reference herein.

FIELD OF THE INVENTION

The invention relates to a compiling device, a compiling method and a computer readable medium.

BACKGROUND

Sometimes it is desirable to prevent some runtime data to be visible during program execution. For example, in computer programs that handle sensitive data it may be preferred to avoid that the sensitive data is handled in the plain in memory. For example, sensitive data may include secret keys that are used, e.g., in financial or multimedia applications. For example, in an implementation of a block cipher, or a keyed MAC, one may try to avoid using key values in plain. Other reasons for hiding data may be to hide the details of a proprietary algorithm.

Various solutions have been devised for this problem. One approach is to mask variables that contain sensitive information. One such approach is detailed in "Side-Channel Analysis Resistant Implementation of AES on Automotive Processors" by Andreas Hoheisel. Masking has disadvantages though. For example, masking still leave an encrypted form of the data available. Furthermore, the mask needs often to be removed before offering the data to the computing unit. For example, this may be needed if operations are to be performed on the masked data which are not compatible with the way the masking its done. In case of block ciphers, the so-called S-boxes may be problematic in this respect.

Another approach is to use white-box cryptography. In white-box cryptography all operations are performed on encoded data, e.g., by applying a bijective function on the data, possibly together with a salt. The computer program is then represented as a table network that operates on the encoded data. An example of such an implementation can be found in "White-Box Cryptography and an AES Implementation", by S. Chow et al. White-box cryptography generally will give a higher level of protection than masking, but there still are disadvantages to this method. One particular problem, is that white-box cryptography often requires substantial involvement of a designer of the computer program. For example, in the case of the AES white-box, a human designer has carefully selected which parts of the program may best be represented by tables.

SUMMARY OF THE INVENTION

A compiling device is presented that addresses these concerns. The compiling device allows a programmer to simply indicate which part of a program are to be hidden during execution. The compiling device uses an SSA graph to analyze the program and find parts that can be implemented efficiently while keeping the desired parts hidden. This may be used to create white-box implementations with substantially less effort on the side of the programmer. The inventors noted that a directly replacement of a subgraph in a SSA graph that is to remain hidden is often not an efficient solution. Applications of the compiling device include protection against side channel attacks, key scraping, also known as memory scraping, and white-box attacks. For example, in a memory-scraping attack the memory of a digital device is scanned for cryptographic keys, e.g., keys used in a DRM protected media player.

In an embodiment, a min-cut algorithm is used to find part of the SSA graph that have small input size, and thus lead to memory efficient implementations.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

Reference is made to Bayrak Ali Galip et al: "Automatic Application of Power Analysis Countermeasures". Reference is made to Giovanni Agosta et al: "The MEET Approach: Securing Cryptographic Embedded Software Against Side Channel Attacks".

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a compiling device, FIG. 1b schematically shows an example of an embodiment of a searching unit, FIG. 2a schematically shows an example of an embodiment of a program fragment, FIG. 2b schematically shows an example of an embodiment of an SSA graph, FIG. 2c schematically shows examples of an embodiment of indicating edges in an SSA graph, FIG. 2d schematically shows an example of an embodiment of an edge in an SSA graph, FIG. 2e schematically shows an example of an embodiment of a modified edge in an SSA graph, FIG. 3a schematically shows an example of an embodiment of an SSA graph, FIG. 3b schematically shows an example of an embodiment of a modified SSA graph, FIG. 4a schematically shows an example of an embodiment of a program fragment, FIG. 4b schematically shows an example of an embodiment of an SSA graph, FIG. 4c schematically shows an example of an embodiment of a modified SSA graph, FIG. 5a schematically shows an example of an embodiment of an SSA graph, FIG. 5b schematically shows an example of an embodiment of a derivative graph, FIG. 5c schematically shows an example of an embodiment of a derivative graph, FIG. 5d schematically shows an example of an embodiment of a min-cut solution, FIG. 5e schematically shows an example of an embodiment of a modified SSA graph, FIG. 6 schematically shows an example of an embodiment of a compiling method, FIG. 7a schematically shows a computer readable medium having a writable part comprising a computer program according to an embodiment, FIG. 7b schematically shows a representation of a processor system according to an embodiment.

LIST OF REFERENCE NUMERALS IN FIGS. 1A-5A 100 a compiling device
102 a source code computer program
104 an indication of a first subgraph (N) of the SSA graph
106 an object code computer program
110 an input
120 a parser
122 a first static single assignment (SSA) graph
130 a searching unit
132 a second graph selector
133 an SSA graph modifier
134 a control flow
136 a second SSA graph
137 information about the implementation of the replaced second subgraph(s)
140 a code generator
200 a searching unit
210 a derivative SSA graph generator
220 a min-cut solver
230 an SSA graph modifier
310 a distribution node
320,330 a vertex
320', 330' a vertex
322,324 a vertex
501-516 a vertex
520 a source
530 a sink
540 an added vertex
570 a min-cut solution

DETAILED DESCRIPTION OF PREFERRED EMBODIMENTS

Figure 1A:
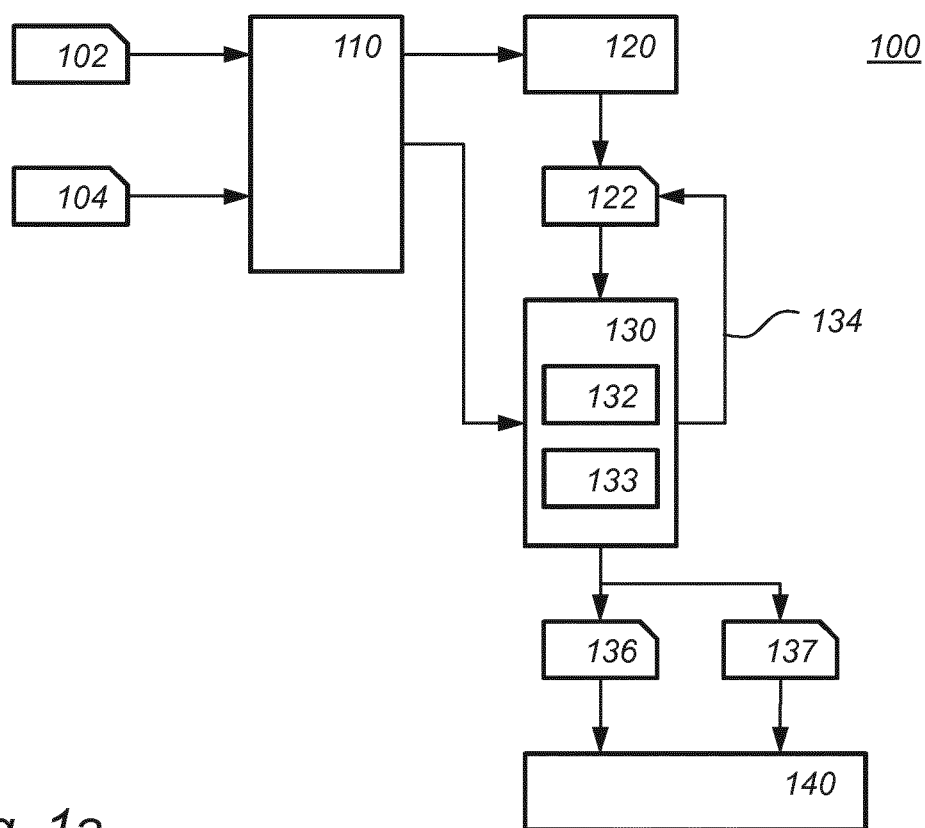

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

As discussed above, it is often desirable to hide intermediate values (also referred to as intermediate datums) in a program. The invention provides a compiler that aims to avoid the explicit computation of such hidden values completely. Embodiment of a compiling method can be implemented in a pass of the compiler. Embodiments may be said to automatically truly hide runtime data, since the data has disappeared from execution.

FIG. 1a schematically shows an example of an embodiment of a compiling device 100. Compiling device 100 is configured to convert a source code computer program 102 into an object code computer program 106. Compiling device 100 comprises an input 110 arranged to receive the source code computer program 102. FIG. 1a shows one possible architecture and/or functional organization of the compiling device in various units. These units may be implemented by a processor circuit (not separately shown in FIG. 1a) as hardware implementation, e.g., dedicated circuits, and/or hybrids therebetween.

Source code 102 is written in a high-level computer program language, such as C, C#, C++, Objective-C, Fortran, Pascal, (Compiled) Basic, Java, and the like. Object code 106 comprises a sequence of statements or instructions in a computer language, usually a machine code language (i.e., binary) or an intermediate language such as Register transfer language (RTL). Object files can in turn be linked to form an executable file or library file. Object code in a machine code language which is linked and placed in an executable file, or a library file, etc., can be executed by a computer configured to the particular machine code language. Examples of machine code language include 80386, ARM, Mips machine code language, and the like.

Object code may comprise placeholders or offsets, not found in the machine code of a completed program, that the linker will use to connect different object codes and/or data together. Whereas machine code is binary code that can be executed directly by the CPU, object code may have jumps and the like partially parameterized so that a linker can fill them in. In an embodiment, compiling device 100 generates object code that ready to be executed, e.g., which is already fully linked.

Compiler device 100 comprises a parser 120. Parser 120 receives source code 102 and analyzes it according to the syntax of the higher order level in which source code 102 is written.

Parser 120 performs a syntactic analysis of the input source code 102. Parser 120 is configured to generate a static single assignment (SSA) graph 122 for at least a portion of the source code computer program.

For example, SSA graph 122 may be generated for a so-called basic block, e.g., a portion of source code 102 that does not contain branches. In an embodiment, the basic-block is allowed to have conditional assignments. In an embodiment, one or more loops in source code 102 is unrolled by compiling device 100, e.g., by parser 120, to enlarge a basis block. Loops to unroll may be identified by compiling device 100, e.g., using conventional heuristics. Alternatively, loops to unroll may be indicated by a programmer, e.g., using a special identifier in source code 102 to identity loops that are to be unrolled. For example, in an embodiment, the main loop in cryptographic operations may be unrolled; For example, a loop indicating the round to execute may be unrolled in a cryptographic primitive, such as a block cipher, e.g., AES, DES, etc., a MAC, e.g., HMAC, an exponentiation function, e.g., for a public-private key cryptosystem, such as RSA. This has the advantage of significantly enlarging the size of the SSA graph 122, and thus the scope for optimizations. The compiling device may also be applied to non-keyed cryptographic functions, e.g., hash functions, such as SHA-1.

Beside of SSA graph 122, parser 120 may build various other data structures, e.g., parse trees, abstract syntax tree, and other hierarchical structures that give a structural representation of the source code input. Such additional structures may assist in the code generation, as is known per se in the art. Other structures than SSA graphs and the details of code generation are not discussed in much detail herein, as they can be performed using conventional techniques.

An SSA graph, in particular SSA graph 122, is a type of dataflow graphs that represents an intermediate form of the source code 102. An SSA graph is directed and acyclic. The vertices of an SSA graph (also referred to as nodes) represent operations. The edges of an SSA graph represent data holders, such as registers, e.g., including virtual registers, or memory, e.g., selected parts of the memory. We will assume that special nodes represent arguments and results of the dataflow graph. FIG. 2a shows an exemplifying program fragment and FIG. 2b a corresponding SSA graph. In FIG. 2b, special nodes are indicated as square boxes, and ordinary nodes as ovals or dots.

The edges in an SSA graph may be multi-edges. A multi-edge connects a vertex to one or more vertices. Instead (or in addition) of multi-edges, the SSA graph may contain distribution nodes, that distribute an incoming value to multiple nodes. FIG. 2b shows two such distribution nodes 310. Note that the SSA graphs which are illustrated graphically herein, may be represented as data structures in an electronic memory of compiling device 100.

The edges of the SSA graph are marked with the bit-size of the corresponding data value. This is the bit-size that must be allocated for this data. Typical bit-sizes are 4, 8, 16, 32, etc. for nibbles, bytes, words, and double-words. Bit sizes may also be, e.g., 1 or 2 to indicate, e.g., a binary flag or a small structure having 4 possible values, respectively. In FIG. 2b, bit sizes are indicated on the edges. Edges in FIG. 2b also indicate the data holder in the program with which they correspond. In an embodiment, all bit sizes are at least 1.

Returning to FIG. 1a. Input 110 is further arranged to receive an indication 104 of a first subgraph N of SSA graph 122. First subgraph N is a connected subgraph of SSA graph 122. The first subgraph is non-empty, e.g., it comprises at least one vertex of graph 122. However, in an embodiment, it is required that the first subgraph comprises at least two vertices, and an edge extending between the two vertices. The first subgraph represents the part of SSA graph 122 of which it is desired that the intermediate values are not explicitly represented in the program (also referred to as hidden). Instead of only a first subgraph, multiple subgraphs may be indicated. The compiling device may select a first subgraph from the multiple indicated subgraphs, e.g., a first one, or a random one, etc. The multiple subgraphs may be indicated by indicating their multiple edges.

Figure 5A:
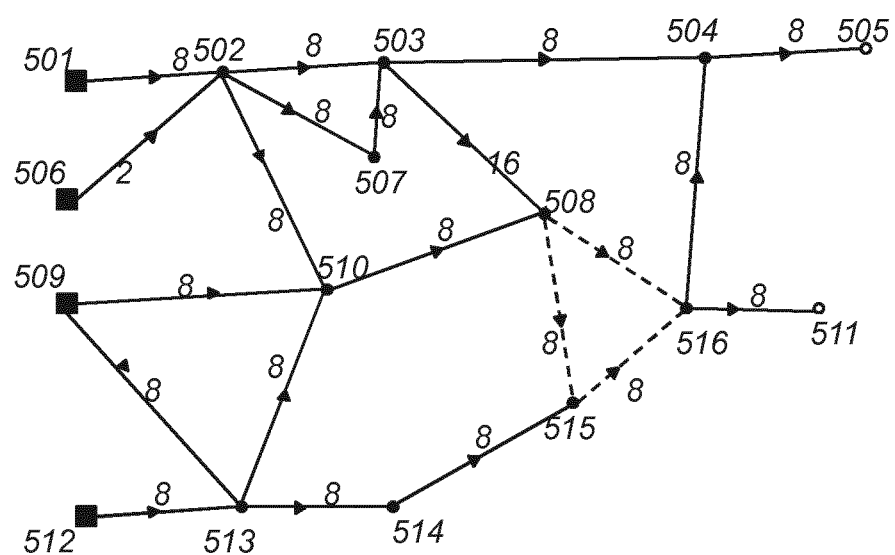

There are a number of ways in which the first subgraph may be indicated. For example, in an embodiment, edges of SSA graph 122 are indicated. Compiling device 100 is arranged to collect all edges that are connected through a path consisting only of hidden edges. In other words, compiler device 100 identifies the connected subgraphs that consist only of hidden edges. There may be only one such subgraph, but there may also be more of them. In the latter case, the algorithm may be iterated over each subgraph. In FIG. 5a, which is further discussed below, an SSA graph is shown in which hidden edges are indicated as dashed edges. The three edges together form a first hidden subgraph. The vertices that are connected to indicated edges may also be regarded as indicated.

For example, in an embodiment, the indication of a first subgraph (N) of the SSA graph comprises an indication of one or more edges of the SSA graph. For example, in the source code an assignment may be labeled, e.g., by a programmer, that the assignment is hidden. For example, such an assignment may look like this: "x=#hidden 3*y" to indicate that the result of the operation 3*y is to be assigned in a hidden manner. The edge in SSA graph 122 that corresponds to this assignment may be labeled hidden. For example, in a data structure that represents an SSA graph, a field may represent that the edge is, or is-not indicate (hidden).

Another way in which first subgraph N may be indicated is by indicating a variable in the source code computer program 102. For example, when a variable is declared, the variable may be labelled. Labelling may also be done in this case by attaching a keyword, in this case to the variable. Interestingly, a variable could be indicated, e.g., labelled after declarations. Furthermore, after indicating a variable, it may be un-indicated, e.g., by a further label. FIG. 2c, shows two example of hiding variables. In the first example, a variable is declared as hidden, i.e., is indicated. In the second example, a variable is declared as a regular variable, which is later labelled as hidden. In Example 2, the variable is later declared as unhidden (not hidden). Unhiding a variable is optional. The processor circuit is arranged to represent assignments to an indicated variable as edges in the SSA graph, and label them as hidden. For example, this may be done by parser 120. In Example 1 of FIG. 2c, all assignments to x will result in an indicated edge. In Example 2, only assignment to x in x=a+b will result in an indicated edge. However, the other assignment between the HIDDEN and UNHIDDEN statements does not result in an indicated edge. In an embodiment, a security supporting programming language is defined, e.g., as an extension of a conventional programming language. In that language, there is keyword HIDDEN that may be added to a variable declaration to denote that the value stored in that variable should not be observed during computation. A source code program written in the security supporting programming language is translated to a dataflow graph by a compiling device 100; The hidden variable translates to a number of edges in the dataflow graph. Thus, a variable marked HIDDEN may give rise to multiple edges which are labeled hidden. Example 3 of FIG. 2c illustrates yet a further way to indicate edges in an SSA graph. Part of the source code 102 is indicated with HIDDEN and UNHIDDEN statements. In an embodiment one could mark all assignments in this part of the source code as hidden. However, this may result in unwieldly large first subgraphs. An improved way is illustrated with respect to FIGS. 2d and 2e.

In an embodiment,

Shown in FIG. 2d is one edge of the SSA graph corresponding to example 3 of FIG. 2c. For example, node 320 may represent the operation x=a+b, which may result in an n bit wide assignment to variable x. Because this assignment occurs in a part of source code 102 that is indicated, the edge is modified as shown in FIG. 2e. The single edge in FIG. 2d is replaced by a path having two additional nodes 322 and 324. Nodes 320' and 330' in FIG. 2e correspond to nodes 320 and 330 but have been modified in the sense that the joint edge of FIG. 2d is replaced with the path of FIG. 2e. In this case the path of FIG. 2e comprises three edges: a first edge from node 320' to node 322, a second edge from node 322 to node 324, and a third edge from node 324 to node 330'. In this case the second edge is a middle edge. The first and third may also be referred as a starting and ending edge respectively.

The first and third edge (or starting and ending edge) are included in the multiple indicated edges, while the second edge (a middle edge) is not included in the multiple indicated edges. When code is generated for the SSA graph the hidden edges can be implemented as a look-up table representing a second subgraph that comprises the hidden edge or edges. Because the path contains a non-hidden edge the SSA graph is broken up, and it is avoided that the entire SSA graph, or large parts thereof, become a single hidden subgraph. A hidden graph that is too large may result in a too large table. The path may be longer than three edges; For example, a directed path may be used with comprises a starting, middle and ending edge, in that order when regarded along the direction of the path. Interestingly, because a hidden starting and ending edge is used together with a non-hidden middle edge, the variable can be implemented as an encoded variable. Due to the optimized second subgraph, this uses an optimized size of encoded input. This allows large parts of source code 102 to be labelled hidden, which may otherwise result in a too large first subgraph. For example, in an embodiment this has successfully been applied to an entire implementation of loop-unrolled the HMAC algorithm.

For example, one may regard node 322 as an encoded operation and node 324 as a decoding operation. In this way, the variable is either represented as a hidden edge, e.g., before the encoding (edge 320'-33) or after the decoding (edge 324-330'), or it is visible but encoded (edge 322-324). This allows an elegant way to have a large number of variable encoded, using table base arithmetic and automatically avoid getting very large tables. The operations encoding and decoding operation may be associated to the edges 322 and 324 just like other operations are associated to nodes in the SSA graph. When the compiler device replaces hidden subgraphs with tables, the encoding and decoding operations are automatically incorporated in the table. For this embodiment tables or table networks are a suitable way to replace the operation represented by the second subgraph.

Encoded input may be achieved by using a second bijective transformation of the variable. To further improve the encoding, the bijection may be applied to the variable and a salt, also referred to as a state. Note that it is generally not required that a table that replaces a hidden subgraph operates on encoded variables; The hidden edge has instead been eliminated, and there is normally no need to operate on encoded variables. In some cases, e.g., using the optimization of FIGS. 2d and 2e working on encoded variables can be used as a compromise to avoid creating too large tables. The encoding/decoding operation in a white-box context is sometimes also referred to as encryption/decryption.

Returning to FIG. 1a. Compiling device further comprises a searching unit 130. Searching unit 130 is configured to search for a second subgraph (P) of the SSA graph, wherein the first subgraph (N) is a subgraph of the second subgraph (N⊆P). Searching unit 130 searches for a subgraph for which the sum of the bit sizes associated to incoming edges of the second subgraph is smaller than a sum of the bit sizes associated to incoming edges of the first graph.

For example, searching unit 130 may be configured to sequentially or parallelly construct multiple subgraphs that extend first subgraph N, e.g., by a second graph selector 132. Searching unit 130 can then compute the sum of the bit sizes associated to incoming edges of the constructed subgraph. Once a subgraph is found that satisfies the requirements it may be taken as the second subgraph. In an embodiment, searching unit 130 first constructs the ancestor graph of the first subgraph, e.g., the graph comprising all nodes and edges that can be connected to the first subgraph with a directed path towards the first subgraph. Constructing larger subgraphs than N may be done by selecting nodes outside N in the ancestor graph.

For example, in an embodiment, the compiling device is arranged to iterate over multiple supergraphs of the first subgraph. A supergraph of the first subgraph is a subgraph of the SSA graph that comprises the first subgraph. The compiling device is configured to select a supergraph of the multiple supergraphs as the second subgraph that has a smaller, preferably minimal, sum of the bit sizes associated to incoming edges of the second subgraph, or selecting the second subgraph equal to the first subgraph if said sum is larger than the sum of the bit sizes associated to incoming edges of the first graph. For less complex situation this searching unit 130 may already produce valid results. However, below a superior algorithm is given that can give better results, especially for larger SSA graphs. Note that supergraphs that have hidden input edges are avoided. This may be hardcoded, or be achieved by setting the bit size of those edges to infinity.

Once a second subgraph P has been found, searching unit 130 may be configured to replace the second subgraph (P) in the SSA graph by a single vertex in an amended SSA graph. The single vertex indicates the same operation in the amended SSA graph as indicated by second subgraph (P) in the unamended SSA graph. In other words, the new amended SSA graph produces the same results but a part of the SSA graph has been replaced with a single operation. Since the edges that were indicated as hidden in the first subgraph N are included in subgraph P, these edges will be effectively hidden since they will be executed as a single operation. For example, this operation may be performed by a SSA graph modifier 133. The single vertex may be the single vertex having the same incoming and outgoing edges as the second subgraph P. Note that edges may collapse in this construction; for example, if P receives two different incoming edges from the same vertex outside of P, then these two incoming edges collapse onto a single edge from the vertex outside of P to the single vertex that replaces P; such edges are added only once to compute the total bit size of the incoming edges.

The second subgraph P produces the same outputs as first subgraph N, but with a smaller input width. It is possible that subgraph P produces more outputs, than first subgraph N did. This can always be resolved by splitting operators with multiple outputs and leave other outputs part of the graph. This is illustrated in FIGS. 3a and 3b. In FIG. 3a, there is the desire to replace the node set that contains just vertex e with a complex operator, e.g., a table. In this case a second subgraph may be formed by vertices d and e, which has an input width of only 6. However, this set has an extra output from d to f. This may be resolved by splitting the operator, leaving the d to f computation part of the graph. This solution is illustrated in FIG. 3b. The new single operator, e.g., the complex operator, T replaces the set {d, e}, while the d to f computation is left in the graph.

An effective way to implement this procedure is to create a new SSA graph from, e.g., SSA graph 122, by adding the single vertex having the same incoming and outgoing edges as the second subgraph P (having collapsed edges if needed) and removing only the original outgoing edges of the first subgraph. Next a dead-code removal algorithm is run on the new SSA graph. Since there are no outgoing edges of the first subgraph N, all hidden edges of N will be removed. Interestingly, if part of P needs to be duplicated to avoid outgoing edges that are not related to the first subgraph, this is thus automatically done. Those parts of P that were only needed for N are removed.

In other words, the dataflow graph is transformed into a semantically equivalent dataflow graph that requires fewer evaluations of hidden edges. In an embodiment, the compiling device may generate an error message if no second subgraph P is found.

The methods above to indicate edges in an SSA graph will usually form multiple unconnected subgraphs. Inside a subgraph all edges are hidden edges. When one of the subgraphs has been replaced as a first subgraph by finding a second subgraph and replacing that with a single node, the number of hidden edges is reduced. However, there may be one or more hidden subgraphs left. This may be resolved by starting the algorithm again over the modified SSA graph. In each iteration, hidden edges may be removed until at some point no hidden edges remain, or for the remaining edges no suitable second subgraph can be found. FIG. 1a indicates a control flow 134 through which the algorithm can be reapplied to the modified SSA graph.

In FIG. 1a, searching unit 130 produces at least two results: a second SSA graph 136 in which at least one second subgraph (a supergraph of the first subgraph) has been replaced by a single vertex, and information 137 about the implementation of the replaced second subgraphs. For example, in an embodiment information 137 is one or more tables that implement the replaced part(s).

The second subgraph P which is replaced by a single complex operator, that has the same inputs as the entire subgraph P. There are many ways to implement such a complex operator, and information about the chosen implementation is contained in information 137. For example, in an embodiment, the complex operator is implemented as a table, e.g., a look-up table, or a table network. Using tables to represent operations is known per se from white-box cryptography. However, the compiling device gives an automatic way to select advantageous candidates suitable for implementation as table or table network. A table receives one or more inputs and produces one or more outputs by looking up the received input in a table. For example, a table can be generated to replace P by evaluating P for all possible inputs and tabulating the results. A table network comprises multiple tables, some of the tables in the table network receive an input of the one or more inputs, some of the table produce an output of the one or more outputs. Some of the table in the table network may instead or additionally receive output of other tables in the table network, while some of the tables may produce intermediate values that not outputs but only used by other tables.

An advantage of tables is that all operations can theoretically be represented as a table. On the other hand, they have the disadvantage that such an implementation may require unpractically large tables. Another approach to implement the second subgraph P is to select a sufficiently large class of operators that can represent many, though perhaps not all, second subgraphs. An example of such a class are affine vector transforms. The affine vectors transform can be applied to the input and produce the output in a manner that may not need the same intermediate results that required to be hidden. Verifying that an affine transformation exists may be done by solving the equation x=Ay+b for matrix A and vector b, wherein x represents the one or more outputs and y the one or more inputs of second subgraph P. An affine transformation has the advantage that it is much smaller than a corresponding table representing the same operation. To avoid the risk that part of the affine transformation is the same as a hidden variable, it may be masked. For example, may choose $A=A_1+A_2$, and $b=b_1+b_2$, and compute $x=(A_1y+b_1)+(A_2y+b_2)$. This may be done by choosing $A_1$ and $b_1$ with random components and computing $A_2$ and $b_2$ therefrom.

Thus, the operation may be implemented so that edges that are internal to N are no longer relevant, and hence the data on those edges is effectively hidden. Unfortunately, lookup tables sometimes use prohibitive amounts of memory, and affine vector transforms may not always exist. In these cases, the compiling device can give feedback indicating which subgraph could not be hidden. Based on this feedback a human operator may be able to rewrite the corresponding part of the source code to avoid this problem. For example, the operator may decide to compromise, and remove the hidden statement for some assignments; or to replace some variables by encoded variables instead of hiding them altogether.

Compiling device 100 comprises a code generator 140. Code generator 140 is configured to generate code to implement the modified SSA graph and generate the object code. In particular, the second subgraph of the SSA graph is implemented in the object code computer program as a single operation thus omitting the assignments corresponding to edges of the first subgraph. For example, code generator 140 may receive from parser 120 a modified SSA graph 136 and information 137 that details how the special vertexes that replaced second subgraphs are to be implemented. Typically, information 137 will be one or more tables for each replaced subgraph.

In an embodiment, the transformation of FIGS. 2d and 2e is used. Replaced subgraphs are implemented as tables which operate on encoded data. Because each edge is replaced with a path that comprises at least a hidden starting edge, an un-hidden middle edge, and a hidden ending edge, it is possible to replace all variables with encoded variables. Information 137 may also comprise encoding information, indicating how variables that are used as input or output of the tables are to be encoded. If needed the code generator may add code that translated codes into and out of encoded form at the beginning or end of the hidden sections.

Figure 1B:
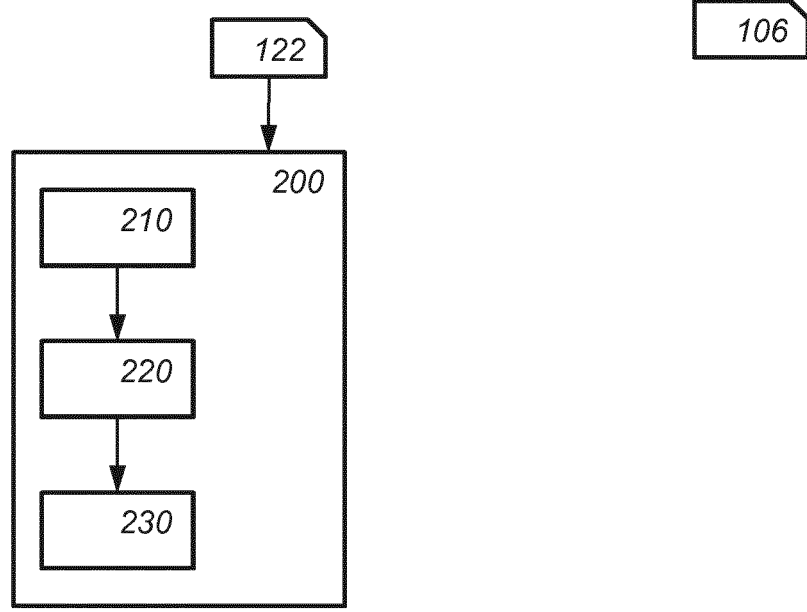

FIG. 1b schematically shows an example of an embodiment of a searching unit 200. Searching unit may be used in FIG. 1a in the place of searching unit 130. Instead of iterating over multiple supergraphs of first subgraph N, searching unit 200 is configured to apply a min-cut algorithm to obtain the second subgraph. The min-cut algorithm is an algorithm that applies to direct graphs having a so-called source and sink vertex, in which the edges have a weight. A min-cut algorithm finds in such a graph a set of edges having minimal summed weight that separates the source vertex from the sink vertex. The skilled person has access to various min-cut algorithms, that run efficiently, e.g., in polynomial time. For example, consider "A Faster Algorithm for Finding the Minimum Cut in a Directed Graph" by Jianxiu Hao published in the Journal of Algorithms 17, 424-446 (1994). It was an insight of the inventor that a min-cut algorithm can be applied to find efficient replacements of hidden subgraphs, and how this can be done. There are several ways in the which the min-cut may be applied, some of which are detailed below.

Embodiments of the algorithm will be explained with reference to FIGS. 5a-5e. FIG. 5a shows an example SSA graph. For example, the SSA graph of FIG. 5a may represent part of source code 102. FIG. 5a uses boxes to represent arguments, e.g., inputs; small open circles to represent outputs, and small closed circles to represent vertices. Edges are labeled with the bit size of the corresponding variable. FIG. 5a shows nodes 501-515. FIG. 5a also shows a first subgraph, which is indicated with dashed edges. The first subgraph in this example is formed by vertices 505, 515 and 516.

In a first stage, a derivative graph is generated from the SSA graph. The vertices in the derivative graph correspond to vertices in the SSA graph, or they are added vertices, such as a source or sink. Note that not all vertices in the SSA graph may be represented in the derivative graph. Creating the derivative graph may be done by a derivative SSA graph generator 210 comprised in searching unit 200.

The derivative graph generated from the SSA graph comprises the vertices and edges (A) in the SSA graph connected with the first subgraph through a directed path comprising an incoming edge of the first subgraph. This is called the ancestor graph of first subgraph N. At least part of the vertices of the first subgraph (N) is also included in the derivative graph. In an embodiment, the first subgraph is completely included in the derivative graph.

Figure 5B:
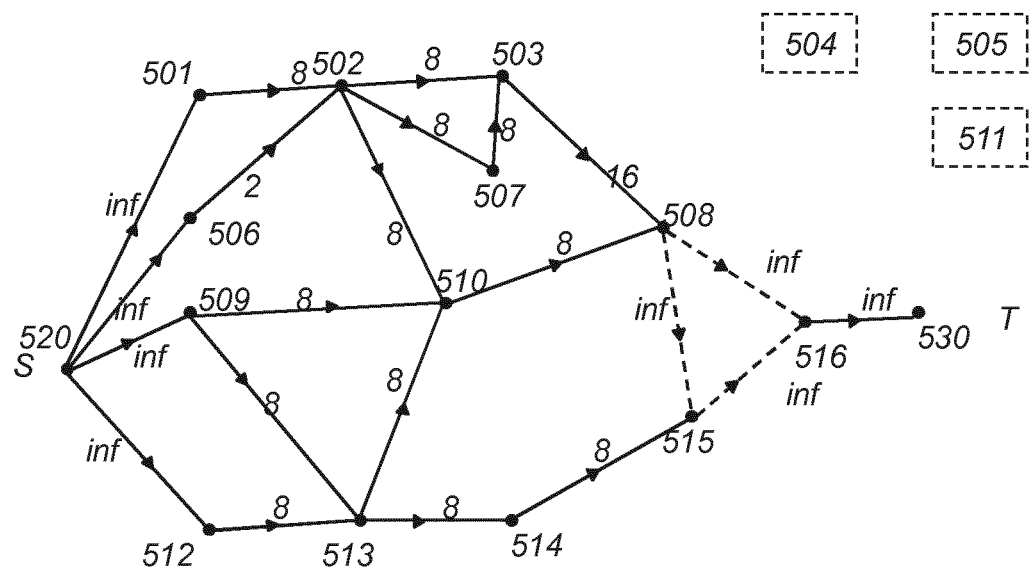
Figure 5C:
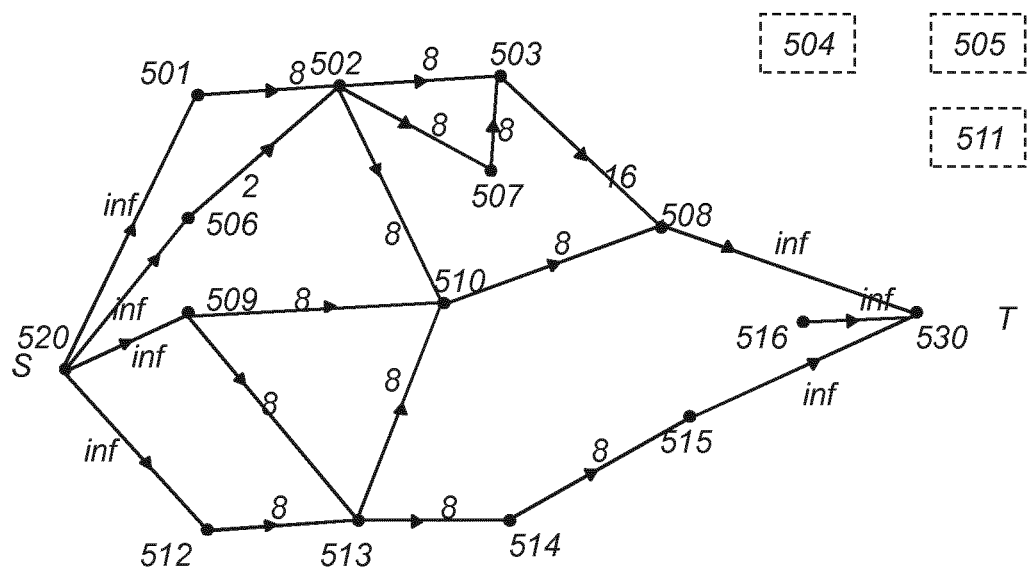
Figure 5D:
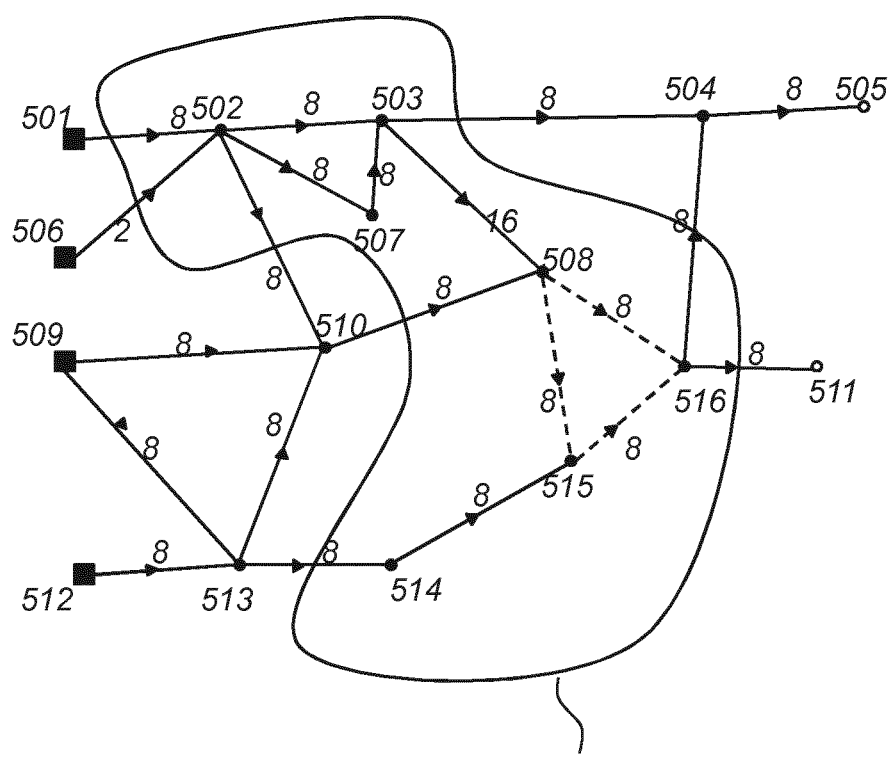

The ancestor graph of N may also comprise N itself. Note that by computing the ancestor graph of the first subgraph one may lose a lot of vertices and edges from the SSA graph. In FIGS. 5b and 5c which show two different example of a derivative graph vertices 504, 505 and 511 are not in the ancestor graph of N and also not in the derivative graph. This is illustrated in FIGS. 5b and 5c by including this labels in a dashed box. Also included in the derivative is a source vertex and a sink vertex. These are added vertices. In FIGS. 5b and 5c the source in indicated with reference numeral 520 and letter S, the sink is indicated with numeral 530 and letter T.

The source vertex is connected with an edge of infinite bit size to vertices in the SSA graph, in particular of the ancestor graph, that have no incoming edge. Vertices in the derivative graph that have no incoming edge are also referred to as the top of the ancestor graph. The sink vertex is connected with an edge of infinite bit size to at least one vertex of the vertices in the first subgraph. In an embodiment, the sink is connected with edges of bit size infinity to at least the vertices of the first subgraph (N) that have an outgoing edge going out of the first subgraph (N).

Edges are normally labeled with the bit size of the corresponding assignment. By assigning a bit size of infinity, it is ensured that this edge will not be part of a min-cut solution. Any other solution that does not use an infinity sized edges will be preferred over solutions that do use such edges. Note that infinity in this case is a term of the art that denotes a sufficiently large number such that these edges are no longer included in solutions. In implementations, one may arbitrarily assign some large number to these edges. If they are still selected in solutions, the value may be increased. Alternatively, one may use for infinity a value larger than the sum of all edges. This guarantees that any solution that uses some or all of the non-infinite edges will have a smaller solution.

FIG. 5b shows a first way to generate the derivative graph. The derivative graph of FIG. 5b comprises: the ancestor graph including all of the first subgraph, a source connected to the tops of the ancestor graph, a sink connected to the bottom(s) vertices in the first subgraph. A bottom vertex of the first subgraph is a vertex that has an edge going out of the first subgraph. All edges have the same bit size as the original SSA graph, except that edges to and from the source and sink, and the edges in the first subgraph have bit size infinity.

FIG. 5c shows a second way to generate the derivative graph. The derivative graph of FIG. 5c comprises: the ancestor graph including all of the first subgraph, a source connected to the tops of the ancestor graph, a sink connected to all vertices in the first subgraph. All edges have the same bit size as the original SSA graph, except that edges to and from the source and sink have bit size infinity. All edges internal to the first subgraph are removed.

In both examples to create a derivative graph, the bit size of any hidden edges not in the first subgraph are also set to infinity. In an implementation, there may be many unconnected subgraphs, but such additional hidden edges are not in FIGS. 5a-5e. For example, a further indication of a further subgraph of the SSA graph may have been received, that is also to be hidden. Note this does not exclude solutions in which the further subgraph falls fully in the second subgraph; this is not a problem.

Finally, a min-cut algorithm is applied in the derivative graph to obtain a partition (S, T) of the derivative graph into two subgraphs, the first of which comprises the source vertex and the second of which comprises the sink vertex. The edges between S and T are the min-cut. For example, searching unit 200 may comprise a min-cut solver 220. The second subgraph can now be obtained in the SSA graph as the subgraph corresponding to the vertices in the second partition comprising the sink.

FIG. 5c shows a min-cut solution 570 projected in the original SSA graph of FIG. 5a. The vertices and edges inside the curve at 570 are part of the min-cut solution. Note that the sum of the bit sizes of the incoming edges of min cut solution 570 is:
Edge 501-502: 8
Edge 506-502: 2
Edge 510-508: 8
Edge 513-514: 8
Total: 26
Compare this to the sum of the sizes of the first subgraph:
Edge 510-508: 8
Edge 503-508: 16
Edge 514-515: 8
Total: 32

In this way, the first subgraph can be represented by a single complex operation that has input size only 26 bits instead of 32 bits. If, for example, the second subgraph were to be represented by a table, it would be a factor $2^6$ smaller (6=32−26) than a table directly for the first subgraph. In larger graphs corresponding to implementation of actual algorithms the savings can be even more substantial. Note that further examples may be obtained from FIG. 5a by changing the bit sizes, e.g., if all bit sizes are divided by 2 the same solution is found.

Figure 5E:
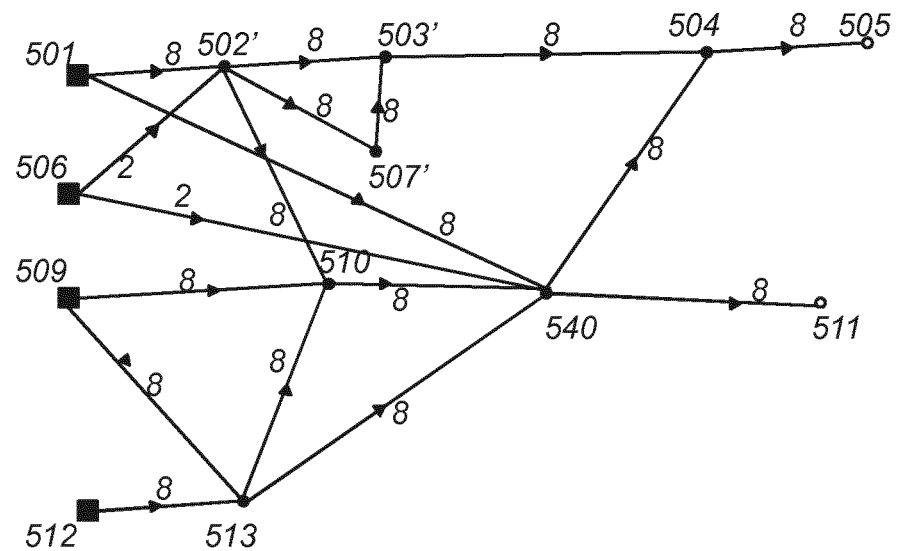

Finally, an SSA graph modifier 230 may modify the original SSA graph and replace the second subgraph with a single, new complex operator. This is illustrated in FIG. 5e. In this example, a new vertex 540 is added that represents the same computation as originally performed by the first subgraph. Note that part of the original of the second subgraph has been duplicated to cover outputs, e.g., outgoing edges, of the second subgraph that are not outputs of the first subgraph. In FIG. 5e nodes 502', 503' and 507' correspond to the nodes 502, 503 and 507 but have been copied to supply nodes 510 and 504 from inputs.

Before the derivative SSA graph is created, some other modifications may be performed. For example, an internal vertex of the first subgraph (N) may be contracted. For example, the first subgraph could be contracted entirely. For example, a dead-code elimination algorithm may be run on the SSA graph first to eliminate dead-code and thus avoid creating tables for code that ought to have been eliminated. Removing part of the SSA graph either temporarily, e.g., by contractions or permanently, e.g., by dead-code removal, reduces the size of the SSA graph in memory which reduces the resources required to run the algorithm.

Below a more mathematical description is given of particular embodiments.

Let N be the first subgraph in the SSA graph G. Subgraph N is non-empty and does not contain special nodes. That is, arguments and results of the graph G are not hidden.

We define the inputs and outputs of set N by:

$$\text{in}.N = \{p \rightarrow q : p \rightarrow q \in G, p \notin N, q \in N\}$$

$$\text{out}.N = \{p \rightarrow q : p \rightarrow q \in G, q \notin N, p \in N\}$$

The notation $p \rightarrow q$ indicates the directed edge from p to q. Let #in be the total width of the inputs of N. Let #out be the total width of the outputs of N. A table implementation of N requires a table with $2^{\#in}$ entries, each of which requires #out bits. This grows quickly and many tables to implement subsets N are often not feasible in current computer architectures.

We are therefore interested in the subgraph P such that:

$$P \supseteq N \wedge \text{out}.N \subseteq \text{out}.P \wedge \#\text{in}.P \text{ is minimal}$$

Such a P must exist, below one way is given to create one constructively. Let A be the ancestor graph of nodes in N, including N itself. Let Top(A) be the nodes in A that do not have ancestors, and that are not part of N. Then Top(A) is non-empty, since N has inputs. We create a special node Source that connects to all Top(A) nodes with edges of width infinity. We remove all edges that are internal to N from A and introduce a special node sink that all nodes in N connect to with edges of width infinity.

Then the input edges to N form a cut of graph A. This means that there is no path from Source to Sink that does not contain one of the input edges of N. It follows that the width of the input arguments of N is at least the width of the least cut of the ancestor graph. If the dataflow graph has further edges outside of N that are marked hidden, the these are changed to size infinity.

Using a min-cut algorithm, we can find a minimal cut of the ancestor graph. Furthermore, we can find a partition of the graph (S; T) where S contains the source node, T contains the sink node, and the edges from S to T form a minimal cut. The set T contains all nodes of N, since the edges from N to sink have a width infinity and are not part of a minimal cut. Hence $T \supseteq N$. The inputs of T are minimal in A, and since A is an ancestor graph, the inputs of T are the same in G. The input of set T do not have hidden inputs, because those have width infinity. Consequently, T will have internal hidden edges, and will not have hidden input edges. T may have hidden output edges, but we keep those as part of the SSA graph, e.g., as illustrated in FIGS. 3a and 3b.

Let p be a node with an outgoing edge marked hidden. Let H: p be the set of all nodes that are reachable from p through a path consisting entirely out of hidden edges. The set H: p is the least set of nodes that we want to create a table operator for. Replacing T with a table operation removes at least 1 hidden edge from the graph. We repeat the process, until no hidden edges are left.

Note that the tables that are obtained in this way are optimal in the input width. Since required memory resources are exponential in the input width, this is the largest contribution. Nevertheless, it remains possible that a set larger than T requires less memory, e.g., a smaller table, because its outputs are smaller. It is possible that the outputs of the large set are so much smaller that this offsets an increase in the input widths.

This occurrence is relatively rare, and one may just accept the possibility that slightly better solutions may exist. Furthermore, it turns out that simple heuristics turn out well in practice. This is because a more efficient implementation, if one exists, should not use the outputs of q. Hence the children of q must be part of the node set. The inputs of T are minimal; thus, any solution that is more efficient requires outputs of descendants of q that are smaller than the outputs of q. Often these outputs do not exist. Furthermore, if they exist, these descendants must be reachable, and internal nodes must be added to the original set. The new set can be transformed in a minimal set with equal outputs to observe any effect on the input width.

Thus, we can quickly and efficiently reduce the search space for more memory efficient implementations. In practice heuristics work well enough. Similarly, it makes sense to find tables that cover as much of the original graph as possible, in order to obtain as few tables as possible. For example, note that in FIG. 5d other equally good solutions are possible, but which cover a smaller part of the SSA graph. Since the algorithm according to an embodiment is so fast, we can run various heuristics in a normal compilation pass. For example, if one want to hide two subgraphs, one may try the algorithm on the union of the two subgraphs.

This solution provides truly hiding data in computations, especially if the solution uses tables. Furthermore, the solution is at least optimal in the number of input bits. The solution supports hiding multiple possible connected hidden values.

Figure 4A:
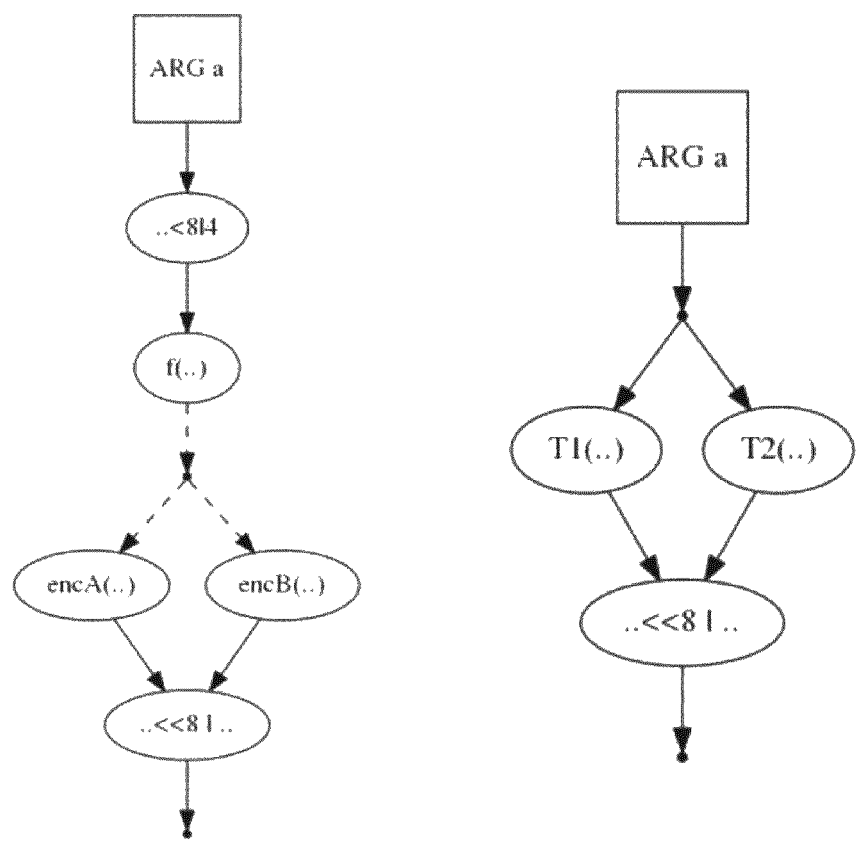

FIGS. 4a-4c show yet a further example. FIG. 4a shows a source code program fragment with a hidden variable. FIG. 4b shows the edges with the hidden property as dotted lines. FIG. 4c shows what happens after the table insertion Embodiments can easily be integrated with conventional compiler techniques.

A prototype has been implemented a prototype in which a programmer can label variables with a hidden property. This property translates to many hidden edges in the dataflow graph that are than covered by the compiling device. We found that this embodiment was both fast and useful to the programmer, especially in security applications. Even if the number of table entries is so large, that hiding in tables becomes infeasible, then this is useful information that a compiler can report directly to a programmer. Even if an optimal solution is not found out-right in terms of memory use, then simple heuristics allow to quickly reduce the search space for better solutions.

In the various embodiments, inputs 102 and 104, e.g., input interfaces, may be selected from various alternatives. For example, input interface may be a network interface to a local or wide area network, e.g., the Internet, a storage interface to an internal or external data storage, a keyboard, etc.

The intermediate results, such as SSA graph 122, second SSA graph 136 and information 137 may be stored in an electronic storage, e.g., comprised in compiling device 100, or accessible thereby. The storage may be implemented as an electronic memory, say a flash memory, or magnetic memory, say hard disk or the like. The storage may comprise multiple discrete memories together making up the storage. The storage may also be a temporary memory, say a RAM.

Typically, the device 100 comprises a microprocessor (not separately shown) which executes appropriate software stored at device 100; for example, that software may have been downloaded and/or stored in a corresponding memory, e.g., a volatile memory such as RAM or a non-volatile memory such as Flash (not separately shown). Alternatively, devices 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, device 100 comprises an input circuit, a parser circuit, a searching circuit, a code generator circuit. The device 100 may comprise additional circuits, e.g., a second graph selector circuit, an SSA graph modifier circuit, a derivative SSA graph generator circuit, a min-cut solver circuit, and the like. The circuits implement the corresponding units described herein. The circuits may be a processor circuit and storage circuit, the processor circuit executing instructions represented electronically in the storage circuits. The circuits may also be, FPGA, ASIC or the like.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6:
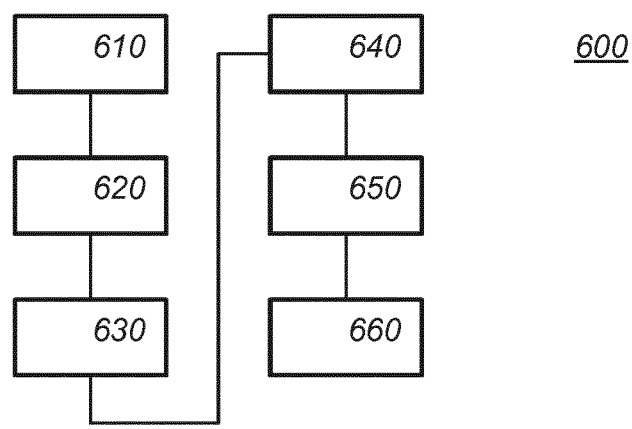

FIG. 6 schematically shows an example of an embodiment of a compiling method 600. Compiling method 600 is configured to convert a source code computer program 102 into an object code computer program 106. The compiling method comprises
 receiving 610 a source code computer program, and
 parsing 620 the source code computer program
 generating 630 a static single assignment (SSA) graph 122 for at least a portion of the source code computer program, vertices of the SSA graph corresponding to operations, and edges of the SSA graph corresponding to assignments, assignments having a corresponding bit size,
 receiving 640 an indication 104 of a non-empty first subgraph N of the SSA graph,
 search 650 for a second subgraph P of the SSA graph, wherein the first subgraph N is a subgraph of the second subgraph N S P, a sum of the bit sizes associated to incoming edges of the second subgraph being smaller than a sum of the bit sizes associated to incoming edges of the first graph,
 implementing 660 the second subgraph of the SSA graph in the object code computer program as a single operation thus omitting the assignments corresponding to edges of the first subgraph.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

FIG. 7a shows a computer readable medium 1000 having a writable part 1010 comprising a computer program 1020, the computer program 1020 comprising instructions for causing a processor system to perform a compiling method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of compiling method.

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the compiling device may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

The following clause is not the claims, but relate to various embodiments of the invention. The Applicant hereby gives notice that new claims may be formulated to this clauses and/or combinations of such clauses and/or features taken from the description or claims, during prosecution of the present application or of any further application derived therefrom. In particular the clause may be combined with any of dependent claims listed below.

Clause 1. A compiling device (100) configured to convert a source code computer program (102) into an object code computer program (106), the compiling device comprising an input (110) arranged to receive a source code computer program, and a processor circuit arranged to parse (120) the source code computer program and generate a static single assignment (SSA) graph (122) for at least a portion of the source code computer program, vertices of the SSA graph corresponding to operations, and edges of the SSA graph corresponding to assignments, assignments having a corresponding bit size, wherein the input (110) is further arranged to receive an indication (104) of a non-empty first subgraph (N) of the SSA graph, and wherein the processor circuit is further arranged to search for a second subgraph (P) of the SSA graph, wherein the first subgraph (N) is a subgraph of the second subgraph (N⊆P), a sum of the bit sizes associated to incoming edges of the second subgraph being smaller than a sum of the bit sizes associated to incoming edges of the first graph, implementing the second subgraph of the SSA graph in the object code computer program as a single operation thus omitting the assignments corresponding to edges of the first subgraph.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim.

These references shall not be construed as limiting the claim.

The invention claimed is:

1. A compiling device configured to convert a source code program into an object code program, the compiling device comprising:
    an input,
    wherein the input is arranged to receive the source code computer program,
    wherein the input is arranged to receive an indication of a non-empty first subgraph of a static single assignment (SSA) graph,
    wherein the indication comprises one or more variables and/or assignments of the source code program,
    wherein the indicated first sub-graph comprises edges that correspond to the one or more variables and/or assignments,
    wherein the first subgraph represents a part of the SSA graph of which it is desired that the intermediate values are not explicitly represented in the program; and
    a processor circuit,
    wherein the processor circuit is arranged to parse the source code computer program,
    wherein the processor circuit is arranged to generate the SSA graph for at least a portion of the source code program,
    wherein vertices of the SSA graph correspond to operations,
    wherein edges of the SSA graph correspond to assignments,
    wherein each of the edges have a bit size corresponding to the assignment to which the edge corresponds,
    wherein the processor circuit is arranged to search for a second subgraph of the SSA graph,
    wherein the first subgraph is a subgraph of the second subgraph,
    wherein a sum of the bit sizes corresponding to incoming edges of the second subgraph is smaller than a sum of the bit sizes associated to incoming edges of the first graph,
    wherein the processor circuit is arranged to implement the second subgraph of the SSA graph in the object code program as a single operation thus omitting the assignments corresponding to edges of the first subgraph.

2. The compiling device as in claim 1, wherein the second subgraph of the SSA graph is implemented in the object code program as a table or table network.

3. The compiling device as in claim 1, wherein the second subgraph of the SSA graph is implemented in the object code program as an affine transformation.

4. The compiling device as in claim 1,
    wherein the second subgraph in the SSA graph is replaced by a single vertex in an amended SSA graph, wherein the single vertex indicates the same operation in the amended SSA graph as indicated by second subgraph in the unamended SSA graph.

5. The compiling device as in claim 1,
wherein the indication of a first subgraph of the SSA graph comprises an indication of one or more edges of the SSA graph,
wherein the processor circuit is arranged to select a first edge of multiple indicated edges and all further edges of the multiple indicated edges connected to the first edge through a path in the SSA graph consisting of indicated edges.

6. The compiling device as in claim 5,
wherein the indication of a first subgraph of the SSA graph comprises an indication of a variable in the source code program,
wherein the processor circuit is arranged to represent assignments to the indicated variable as edges in the SSA graph,
wherein represented edges are included in the indication of the multiple edges of the SSA graph.

7. The compiling device as in claim 6,
wherein the indication of a first subgraph of the SSA graph comprises an indication of a portion of the source code program,
wherein the processor circuit is arranged to represent assignments in the indicated portion of the source code program as a path comprising a starting edge, a middle edge and an ending edge,
wherein the starting and ending edge are included in the multiple indicated edges,
wherein the middle edge not is included in the multiple indicated edges.

8. The compiling device as in claim 2, wherein the table or table network operates on encoded data.

9. The compiling device as in claim 1,
wherein the processor circuit is arranged to generate a derivative graph from the SSA graph,
wherein the derivative graph comprises:
the vertices and edges in the SSA graph connect with the first subgraph through a directed path comprising an incoming edge of the first subgraph,
a source vertex connected with an edge of infinite bit size to vertices in the SSA graph that have no incoming edge,
at least part of the vertices of the first subgraph comprise:
a sink vertex connected with an edge of infinite bit size to at least one vertex of the vertices in the first subgraph,
apply a min-cut algorithm in the derivative graph to obtain a partition of the derivative graph into two subgraphs, the first of which comprises the source vertex and the second of which comprises the sink vertex, obtaining the second subgraph in the SSA graph as the subgraph corresponding to the vertices in the second partition.

10. The compiling device as in claim 9,
wherein the derivative graph from the SSA graph comprises no edges of the first subgraph,
wherein the sink is connected with edges of bit size infinity to all vertices of the first subgraph,
or wherein the derivative graph from the SSA graph comprises edges of the first subgraph wherein a bit size of the edges has been set at infinity.

11. The compiling device as in claim 1,
wherein the compiling device is arranged to receive a further indication of a further subgraph of the SSA graph,
wherein the processor circuit is arranged to set bit sizes of edges in the further subgraph to infinity before searching for the second subgraph.

12. A compiling method configured to convert a source code program into an object code program, the compiling method comprising:
receiving a source code program;
parsing the source code program;
generating a static single assignment (SSA) graph for at least a portion of the source code program,
wherein vertices of the SSA graph correspond to operations,
wherein edges of the SSA graph correspond to assignments,
wherein each of the edges have a bit size;
receiving an indication of a non-empty first subgraph of the SSA graph,
wherein the indication comprises one or more variables and/or assignments of the source code program,
wherein the indicated first sub-graph comprises edges that correspond to the one or more variables and/or assignments,
wherein the first subgraph represents a part of the SSA graph of which it is desired that the intermediate values are not explicitly represented in the program;
searching for a second subgraph of the SSA graph, wherein the first subgraph is a subgraph of the second subgraph, and wherein a sum of the bit sizes corresponding to incoming edges of the second subgraph is smaller than a sum of the bit sizes associated to incoming edges of the first graph; and
implementing the second subgraph of the SSA graph in the object code program as a single operation thus omitting the assignments corresponding to edges of the first subgraph.

13. A computer readable medium comprising non-transitory data representing instructions to cause a processor system to perform the method according to claim 12.

14. The compiling device as in claim 1,
wherein the processor circuit is arranged to iterate over multiple supergraphs of the first subgraph,
wherein in each iteration the processor circuit is arranged to select a supergraph of the multiple supergraphs as the second subgraph,
wherein a minimal sum of the bit sizes is associated to incoming edges of the second subgraph,
or the processor circuit is arranged to select the second subgraph equal to the first subgraph if the minimal sum is larger than the sum of the bit sizes associated to incoming edges of the first graph.

15. The compiling device as in claim 1, wherein the searching for a second subgraph comprises applying a min-cut algorithm.

* * * * *